United States Patent [19]
Alred

[11] 3,746,117
[45] July 17, 1973

[54] SPHERICAL VEHICLE
[76] Inventor: Ray Alred, 702 S. Yakima, Apt. 3, Tacoma, Wash. 98405
[22] Filed: Oct. 6, 1971
[21] Appl. No.: 186,905

[52] U.S. Cl. ............... 180/21, 180/7 P, 180/7 J, 180/10, 115/20, 280/206
[51] Int. Cl. ............................................. B62d 55/00
[58] Field of Search ............... 180/21, 7 J, 7 P, 180/10; 280/206; 115/20

[56] References Cited
UNITED STATES PATENTS
1,265,496  5/1918  Pare ................................. 180/10 X
1,502,632  7/1924  Hasley ............................. 180/10
1,915,886  6/1933  Gutierrez ......................... 180/10
2,009,904  7/1935  Purves ............................ 180/10 X
3,013,806  12/1961 Boyd .......................... 280/206 UX
3,327,801  6/1967  Ezra ................................. 180/21

FOREIGN PATENTS OR APPLICATIONS
602,297  8/1972  Germany ............................ 180/7P Primary Examiner—Leo Friaglia
Attorney—Eugene D. Farley

[57] ABSTRACT

A vehicle for traversing rough terrain comprises a hollow, foraminous spherical body containing an upright frame. A pair of bearing wheel assemblies is mounted one assembly on each end of the frame with its component wheels in bearing contact with the inner surface of the sphere, thereby centering and supporting the frame. A reaction thrust engine is mounted on the frame and directed outwardly through the foramens of the body for propelling the vehicle. Operation of the engine thus causes the vehicle to roll over the ground, the interior frame, which may mount an operator's station, remaining upright.

3 Claims, 6 Drawing Figures

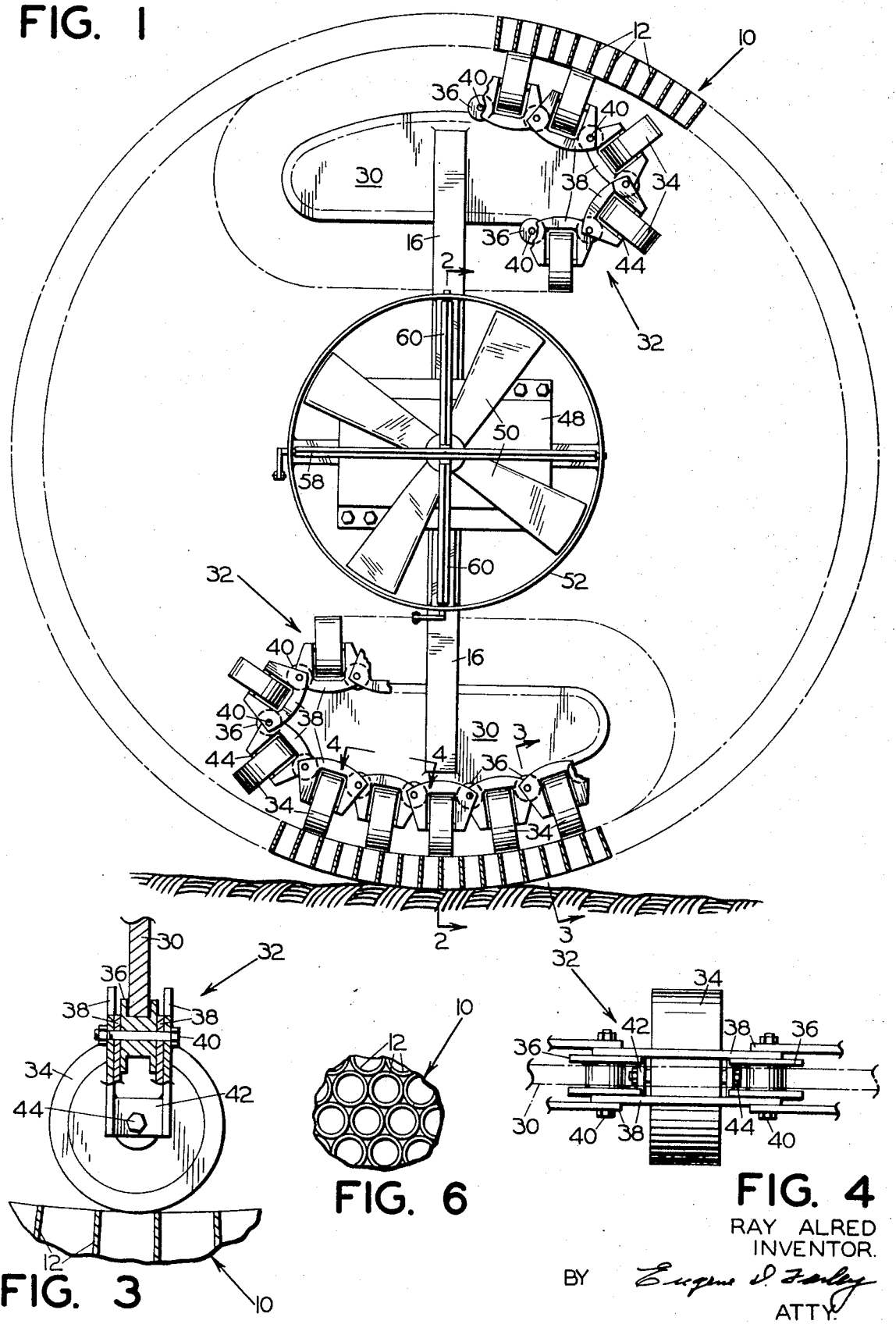

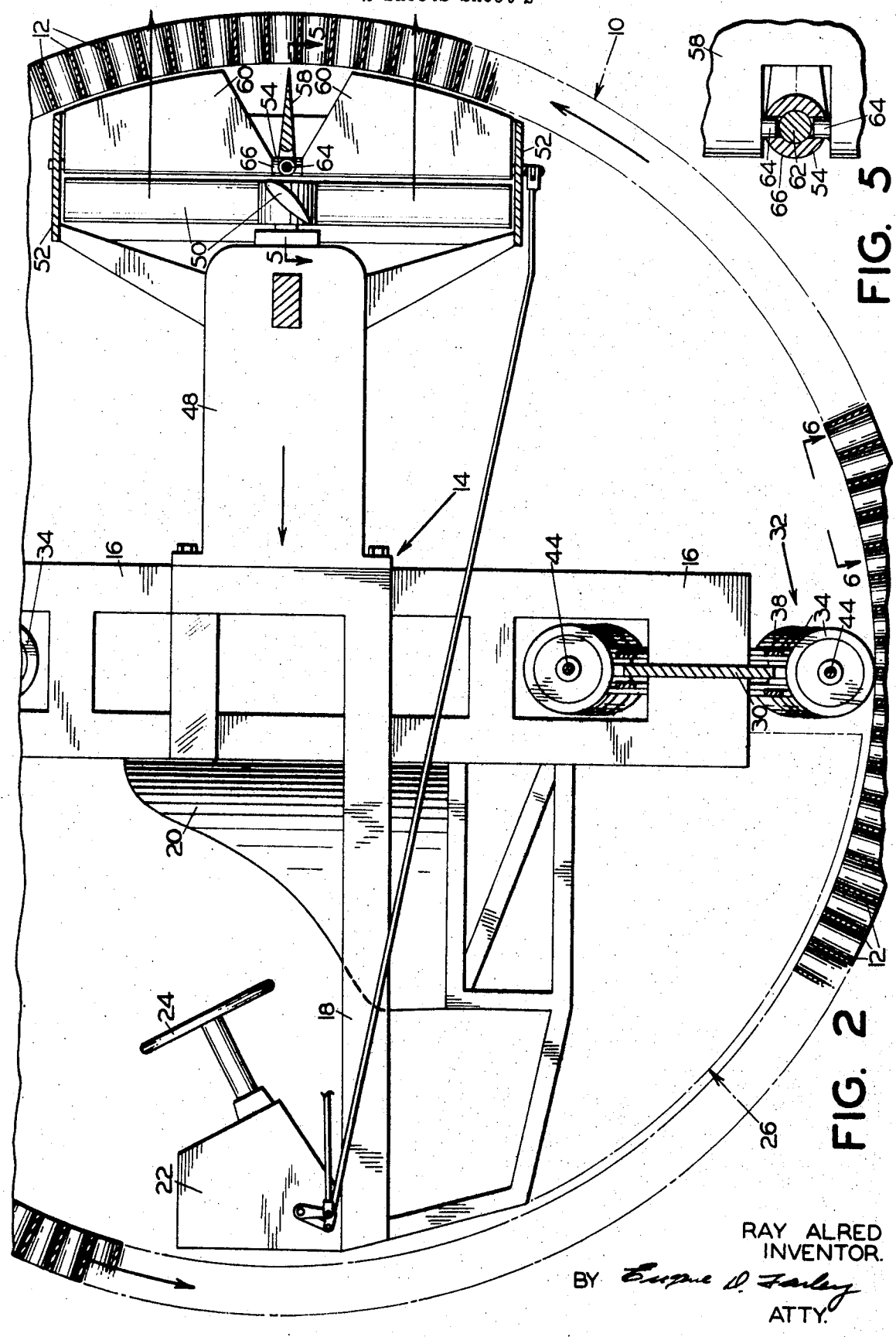

SPHERICAL VEHICLE

This invention relates to spherical vehicles which are self-propelled and adaptable to traversing rough terrain, being controlled by an operator either riding within the vehicle or located at a remote station.

To facilitate the exploration of remote rugged areas, there is needed a vehicle which is suitable for traversing rough terrain such as wilderness areas, glaciers, swamps, mountains, submarine floors, barren celestial surfaces, etc.

It is the general object of the present invention to provide such a vehicle.

It is another object of the present invention to provide a self-propelled spherical vehicle which may be built in either small, intermediate, or giant sizes; which may be controlled by an operator mounted on the vehicle, or from a remote station; which is submersible; which may be operated in the absence of the earth's atmosphere, which is easily controlled and steered; and which is of strong, durable construction.

It is a further object of the present invention to provide a self-propelled spherical vehicle which is suitable for use in military applications, e.g. as a vehicle for mounting artillery, or as a self-contained remotely controlled demolition device.

It is yet another object of the invention to provide a self-propelled spherical vehicle having a rugged, outer case which protects the operator while still affording him good vision and positive control of the vehicle.

The foregoing and other objects of this invention are accomplished by means of a self-propelled vehicle which, broadly considered, comprises a body in the form of a hollow, foraminous sphere having a ground-contacting exterior surface. A frame is positioned substantially diametrically within the body and maintained upright gravitationally, gyroscopically or by other suitable means.

A pair of bearing wheel assemblies are mounted one on each end of the frame. The component wheels of each wheel assembly are in bearing contact with the inner surface of the vehicle body, thereby centering and supporting the frame. A reaction thrust engine is mounted on the frame and directed outwardly through the foraminous body for propelling the vehicle. Suitable steering means is associated with the engine for driving the vehicle in a selected direction.

Thus, by providing a vehicle having a relatively small body, a self-contained projectile-carrying or instrument-carrying medium may be provided. By providing a vehicle having a large body, many feet in diameter, an instrumentality may be provided which is capable of traversing rough terrain with or without being controlled by an operator housed in the body.

Considering the foregoing in greater detail and with particular reference to the drawings, wherein:

FIG. 1 is a fragmentary, transverse sectional view of the spherical vehicle of my invention;

FIG. 2 is a fragmentary, sectional view taken along line 2—2 of FIG. 1;

FIGS. 3 and 4 are detail, sectional views taken along lines 3—3 and 4—4 of FIG. 1, respectively; and FIGS. 5 and 6 are detail, sectional views taken along lines 5—5 and 6—6 of FIG. 2, respectively.

As indicated in FIGS. 1 and 2, the vehicle is housed in a body indicated generally at 10 having the form of a hollow, foraminous sphere. The sphere may be variously constructed, as from perforated meta' plate, expanded metal, or, particularly in the case of the larger vehicles, from a plurality of tubes or pipes 12 laid side by side in nesting relation and welded or otherwise fixed together. The tubes preferably are slightly tapered to provide the necessary fit.

The resulting tube assembly is of great strength and rigidity. Hence it may be employed in the construction of vehicles having diameters of the order of 60 or 80 feet, where self-contained vehicles for use in exploration are contemplated. On the other hand, the vehicles may be relatively small, having diameters of only 1 or 2 feet where a remote controlled demolition or instrument-carrying apparatus is desired.

The openings in the spherical body may vary in size from a fraction of an inch in the case of the smaller vehicles up to several inches in the case of the larger. Also, they may be variously shaped as round, square, or angular. Their spacing from each other may be as required to suit a particular purpose. However, in general there should be a sufficient open area to accommodate the thrust of the engine and to prevent, or at least minimize, plugging of the openings by terrain components which are traversed during operation of the vehicle.

The outer surface of sphere 10 is designed for ground-engagement. In the case of the larger spheres, it will traverse irregularities and obstacles of substantial size. In the case of the heavier vehicles, it will further expedite its progress by crushing or driving into the ground obstacles which it traverses.

The inner surface of the sphere is relatively smooth and uniform, as required for the tracking of an inner frame 14, which mounts the driving engine, the steering mechanism, the operator, if one is aboard, and whatever freight and equipment is to be carried by the vehicle. The frame is comprised of an upright segment 16 by means of which it is located and supported, and a horizontal segment 18 which carries the operator and pay load. Thus horizontal frame component 18 may support an operator's seat 20, an instrument console 22 and a steering wheel or rudder stick 24.

Means also are provided for maintaining the frame upright within the sphere. This may be accomplished easily by providing weighted members, which may be load components in the lower portion of the frame. It also may be accomplished by providing gyroscopic or other type stabilizers.

For some applications it may be desirable to include between the frame and the interior surface of the spherical body a web member 26 comprising a hull or nacelle. This may be open or boat-shaped, as required to shield the operator only; or entire, where a sealing function is desired, as in the provision of a submersible vehicle. The web may be comprised of structural steel plates of the desired structural properties and contour.

Upright component 16 of the frame mounts the means by which the frame is supported and centered within the spherical body. The assemblies by which this is accomplished are illustrated in FIGS. 1–4 inclusive.

Each end of frame member 16 mounts a guide plate 30 arranged at right angles to the direction of travel of the vehicle. The guide plate is of heavy construction and has a lower, arcuate edge having an arc concentric with the curvature of the sphere.

The plate in turn mounts a wheel assembly, indicated generally at 32, comprising a plurality of individual bearing wheels 34 mounted with their planes lying radially of the sphere in the direction of movement of the latter. The wheels preferably are rubber tired and have a width sufficient to span the openings of the sphere.

Means are provided for mounting wheels 34 for free rotation and for tracking them sequentially on the inner surface of the spherical body during the progress and maneuvering of the vehicle. To this end there is provided a link chain-type mounting, the construction of which is shown particularly in FIG. 4.

The mounting is comprised of grooved guide wheels 36, the grooves of which track on plate 30. These support a plurality of U-shaped plates 38, the ends of which are overlapped and pivotally connected, link chain fashion, by pins 40.

The U-shaped plates mount at their ends connecting plates 42 which support bolts 44. The latter serve as axles for rotatably mounting bearing wheels 34.

The number of wheel units thus mounted is such as to provide the desired bearing against the upper and lower inner surfaces of the sphere, as required to support and center the frame.

The spacing of the wheels is such as to enable the wheel assembly to track freely on guide plate 30. This makes possible utilization of all of the wheels at one time or another, as they work against the inner surface of the sphere.

The vehicle is self-propelled by a reversible, reaction thrust engine suitably mounted and located to drive the vehicle in the desired direction at the desired speed. Although a conventional jet engine may be employed for this purpose, the drawings illustrate the application of a ducted fan type propelling unit.

The engine, indicated at 48, is bolted to the frame in the manner shown in FIG. 2. It may be any one of the conventional classes of internal combustion engines and is fitted in the usual manner with a propeller 50 working in a shroud 52. Operation of the engine thus sucks air through the openings in the forward part of the vehicle and blasts it out through those in the rear, providing a propelling force.

The vehicle is steered by controlling the direction of the thrust of the air blast.

Steering wheel 34, or, in the alternative, a stick similar to that provided in aircraft, is connected to a pair of linkages 54, 56. Linkage 54 is coupled to horizontal pitch control vanes 58 which control the pitching angle of the vehicle. Linkage 56 is coupled to vertically arranged rudder vanes 60 which control the horizontal direction taken by the vehicle.

As shown in the detail view of FIG. 5, the vanes are mounted on a shaft 62 by means of pins 64 and sleeve 66. The latter is integral with rudder vanes 60.

If the vehicle is to be operated by a driver, a suitable door or access opening is provided in the spherical body as well as in the interior hull. The operator drives the vehicle partly in the manner of a wheeled vehicle, the sphere serving as the single wheel, and partly in the manner of an aircraft, the reaction thrust engine and steering vanes serving as the driving and steering mechanism.

The vehicle will be propelled over the ground at a rate determined by the thrust applied, in a direction determined by the setting of the vanes. By reason of its construction, the sphere will traverse all irregularities of ground commensurate with its size. Adjustment of the steering controls will first turn the frame and operator's station. This movement will then be followed by a corresponding arcuate movement of the sphere until it is headed in the desired direction.

At all times the frame spanning and bearing against the interior surfaces of the sphere will maintain itself upright and properly centered. It will be maintained upright by gravitational effects exerted by the lower frame portion and load, or by gyroscopic stabilizers if the latter are supplied. The vehicle thus is enabled to traverse irregular, rough terrain not traversable in the usual manner by vehicles of conventional classes.

Having thus described my invention in preferred embodiments, I claim:

1. A vehicle for traversing rough terrain comprising:
   a. a vehicle body in the form of a hollow, foraminous sphere having a ground-contacting exterior surface,
   b. an upright frame substantially diametrically located within the body,
   c. a pair of bearing wheel assemblies mounted one on each end of the frame, with its component wheels in bearing contact with the inner surface of the body, thereby centering and supporting the frame therein, each bearing wheel assembly comprising
      1. a guide plate fixed to an end of the frame and spaced from the inner surface,
      2. the guide plate having an arcuate outer surface substantially concentric with the surface of the sphere,
      3. a plurality of rotatably mounted wheels arranged with their planes in the direction of travel of the vehicle, and
      4. slide means mounting the wheels on the plate, and
   d. reaction thrust engine means mounted on the frame and directed outwardly through the foraminous body for propelling the vehicle in a predetermined direction.

2. The vehicle of claim 1 wherein the slide means comprises link chain slide means.

3. A vehicle for traversing rough terrain comprising:
   a. a vehicle body in the form of a hollow, foraminous sphere having a ground-contacting exterior surface,
   b. an upright frame substantially diametrically located within the body,
   c. a pair of wheel bearing assemblies mounted one on each end of the frame, with its component wheels in bearing contact with the inner surface of the body, thereby centering the supporting the frame therein,
   d. reaction thrust engine means mounted on the frame and directed outwardly through the foraminous body for propelling the vehicle in a predetermined direction, the thrust engine means producing a propelling gaseous stream, and
   e. steering means comprising steering vanes adjustably located in the gaseous stream.

* * * * *